US010574759B2

(12) United States Patent
Appleyard et al.

(10) Patent No.: US 10,574,759 B2
(45) Date of Patent: *Feb. 25, 2020

(54) MESSAGE-BASED CONTEXTUAL DIALOG

(71) Applicant: International Business Machines Corporation, Armonk, NY (US)

(72) Inventors: James P. Appleyard, North Richland Hills, TX (US); Shiju Mathai, Carrollton, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/276,021

(22) Filed: Feb. 14, 2019

(65) Prior Publication Data

US 2019/0182334 A1 Jun. 13, 2019

Related U.S. Application Data

(63) Continuation of application No. 14/989,996, filed on Jan. 7, 2016, now Pat. No. 10,257,281.

(51) Int. Cl.
G06F 16/954 (2019.01)
H04L 29/08 (2006.01)
H04L 12/24 (2006.01)
H04W 4/20 (2018.01)
G06F 9/50 (2006.01)

(52) U.S. Cl.
CPC ............ *H04L 67/14* (2013.01); *G06F 9/5044* (2013.01); *H04L 41/0253* (2013.01); *H04L 41/5009* (2013.01); *H04L 67/16* (2013.01); *H04L 67/32* (2013.01); *H04W 4/203* (2013.01)

(58) Field of Classification Search
CPC ............... H04L 41/5009; H04L 65/403; H04L 41/0253; H04L 67/327; G06F 9/5044; G06F 17/30873; G06F 17/30283; G06F 17/30401; G06F 17/30654; H04W 4/203
See application file for complete search history.

(56) References Cited

U.S. PATENT DOCUMENTS

| 8,677,253 | B2 | 3/2014 | Duquene et al. | |
|---|---|---|---|---|
| 9,661,040 | B2 * | 5/2017 | Kobayashi | H04L 65/403 |
| 2004/0083195 | A1 | 4/2004 | McCord et al. | |
| 2013/0254297 | A1 * | 9/2013 | Kobayashi | H04L 65/403 |
| | | | | 709/205 |
| 2014/0053085 | A1 * | 2/2014 | Stephure | G06F 16/954 |
| | | | | 715/753 |
| 2014/0184519 | A1 | 7/2014 | Benchenaa et al. | |

(Continued)

Primary Examiner — Kyung H Shin
(74) Attorney, Agent, or Firm — Cuenot, Forsythe & Kim, LLC

(57) ABSTRACT

A message based contextual dialog may be conducted by establishing, using a processor, a collaborative session between a first client device and a second client device, receiving, using the processor, a message from the first client device, and detecting, using the processor, a request for a service within the message. Responsive to the request, a service correlated with the request may be invoked using the processor. A result from execution of the service may be provided, using the processor, to the first client device and the second client device as part of the collaborative session.

15 Claims, 6 Drawing Sheets

(56) References Cited

U.S. PATENT DOCUMENTS

2015/0081361 A1\* 3/2015 Lee ..................... H04W 4/203
 705/7.13
2015/0244600 A1\* 8/2015 Ranganathan ...... H04L 41/5009
 709/204
2017/0201587 A1 7/2017 Appleyard et al.

\* cited by examiner

MESSAGE-BASED CONTEXTUAL DIALOG

BACKGROUND

This disclosure relates to collaborative communications and, more particularly to a collaborative communication platform that supports message-based contextual dialog.

Applications that execute on mobile devices generally consume the entire display screen of the mobile device when executed. The applications embrace a single page user interface model. The functional state of the application dictates the appearance of the user interface. Different functions of the application are brought together using a menu system. In order for a user to switch from one function of the application to another, the user typically selects a different option from the menu, thereby causing a screen redraw to present a new single page user interface that takes up the entire display screen of the mobile device.

In some cases, the operating state of the application may be stored. Typically, upon exit, the most recent operating state of the application is stored. When the application is relaunched, that most recent operating state may be recalled and restored. Prior state information is effectively lost as the application continues to execute and the single page interface is continually redrawn in accordance with the user requested operations performed.

SUMMARY

An embodiment of the present invention may include a method. The method may include establishing, using a processor, a collaborative session between a first client device and a second client device. The method may include receiving, using the processor, a message from the first client device. The method may also include detecting, using the processor, a request for a service within the message. Responsive to the request, a service correlated with the request may be invoked using the processor. A result from execution of the service may be provided, using the processor, to the first client device and the second client device as part of the collaborative session.

Another embodiment of the present invention may include a system having a processor programmed to initiate executable operations. The executable operations may include establishing a collaborative session between a first client device and a second client device. The executable operations may include receiving a message from the first client device. The executable operations may also include detecting a request for a service within the message. Responsive to the request, a service correlated with the request may be invoked. A result from execution of the service may be provided to the first client device and the second client device as part of the collaborative session.

Another embodiment of the present invention may include a computer program including a computer readable storage medium having program code stored thereon. The program code is executable by a processor to perform a method. The method may include establishing, using a processor, a collaborative session between a first client device and a second client device. The method may include receiving, using the processor, a message from the first client device. The method may also include detecting, using the processor, a request for a service within the message. Responsive to the request, a service correlated with the request may be invoked using the processor. A result from execution of the service may be provided, using the processor, to the first client device and the second client device as part of the collaborative session.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to collaborative communications and, more particularly to a collaborative communication platform that supports message-based contextual dialog. In accordance with the inventive arrangements disclosed herein, a collaborative platform is disclosed that allows two or more users to communicate in a message-based collaborative session. Users involved in the collaborative session may access applications which may be integrated into the collaborative session as services. The services may be invoked using text messages exchanged between the users in the form of natural language. With the execution of services, user interfaces generated by the services, results from the services, and the like may be presented within the collaborative session to each of the users involved through the client device of the user.

By integrating applications as services within a collaborative session, the context of the collaborative session may be maintained. The messages that are exchanged within the collaborative session, the use of services, and results generated from execution of the services become part of a threaded history. The history may be persisted as a collaborative session history. The collaborative session history may be reviewed to see the exact context in which decisions were made, operations by the services were performed, and when users joined and/or left the collaborative session. Further aspects of the inventive arrangements are described below in greater detail with reference to the drawings.

Figure 1:
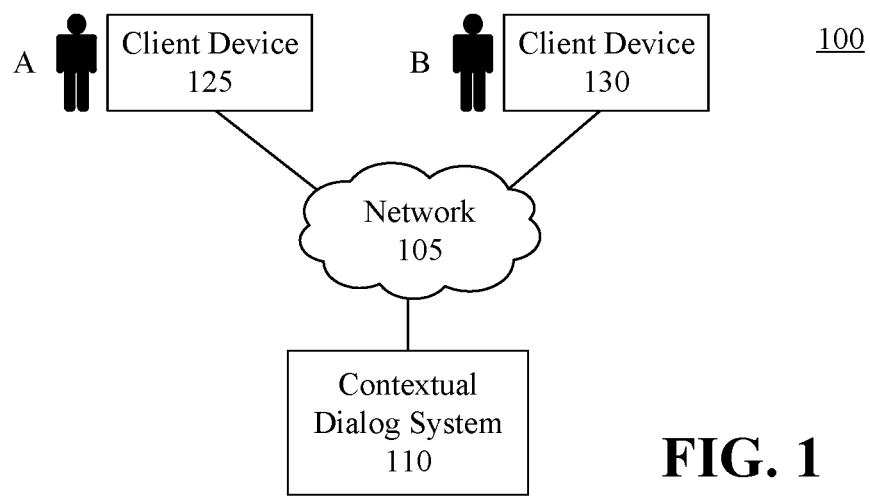
FIG. 1 is a block diagram illustrating an example of a network computing system.

FIG. 1 is a block diagram illustrating an example of a network computing system 100 in which the inventive arrangements may be implemented. Network computing system 100 contains a network 105. Network 105 is the medium used to provide communications links between various devices and data processing systems connected together within network computing system 100. Network 105 may include connections, such as wired communication links, wireless communication links, or fiber optic cables.

Network 105 may be implemented as, or include, any of a variety of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), or the like.

In example of FIG. 1, a contextual dialog system (system) 110 and client devices (clients) 125 and 130 may couple to network 105. System 110 may be implemented as a data processing system, e.g., a server, or as one or more interconnected data processing systems, e.g., servers, executing suitable operational software to support message-based communications as described herein between client 125 and client 130. Clients 125 and 130 may be, for example, personal computers, portable devices, network computers, tablet computers, mobile phones (e.g., "smart phones" capable of executing applications), or the like.

Clients 125 and 130 may communicate with system 110 in order to exchange messages and invoke services as described herein. In one aspect, system 110, as part of establishing a collaborative session, may perform instant messaging operations such as instant message handling and/or delivery. Within this disclosure, the terms "instant messaging," "messaging," or derivatives thereof, refer to instant messaging, text messaging, Short Message Service (SMS) communications, or other forms of messaging that provide real time or near real time communication.

As defined herein, a collaborative session is a communication session between two or more clients through which instant messaging may be performed in combination with invocation of services that are participating in the collaborative session. Within the collaborative session, users may exchange messages and invoke services such that the invocation and/or results generated by the services may be distributed among the clients participating in the collaborative session and intermingled with messages exchanged in a time ordered listing of the events (e.g., messages, queries, results, etc.) occurring in the collaborative session. A collaborative session, as defined herein, does not include screen sharing.

In one arrangement, user A of client 125 may initiate a collaborative session with user B of client 130 through system 110. User A may add, dynamically, one or more services to the collaborative session with user B. Dynamically adding a service means that the service is added to, and may participate in, the collaborative session at and/or during runtime for the collaborative session. User A and user B, working through their respective clients 125 and 130, may exchange messages with one another as part of the collaborative session. In one aspect, as messages are exchanged, system 110 may process the messages to detect portions of text identified as requests for services. The requests, responsive to detection, may cause system 110 to execute one or more services. The services that are executed may be made available to both user A and to user B within each user's respective client 125 and 130.

The invocation of services, results from services, and messages may be ordered as presented on a display of both client 125 and client 130 as a threaded conversation. Either user may scroll back through the threaded conversation of the collaborative session, including the various operations performed using the services. Each of clients 125 and 130 may execute a stateful contextual application that may be programmed to show an inline threaded user interface (UI) in which messages, services, and the like may be shown. In one aspect, the execution of a service may cause a UI to be generated, provided to clients 125 and 130, and displayed in each of clients 125 and 130 as part of the threaded conversation inline for the collaborative session. One or more elements of the UI may be active and selectable by a user to invoke further functions and/or operations of the service that generated the UI.

Because services may be added dynamically at runtime, system 110 need not be re-written. One or more additional services may be made available and accessed by users involved in the collaborative session. In addition, if user A has a subscription to a particular service and user B does not, user B may be provided access to the service at least in the context of the collaborative session between user A and user B. The service may be accessed and utilized within the collaborative session by both user A and user B.

FIG. 1 is provided for purposes of illustration and is not intended to limit the inventive arrangements described herein. It should be appreciated that network computing system 100 may include fewer elements than shown or more elements than shown such as additional servers, clients, and other devices. For example, a collaborative session may include more than two users and corresponding clients.

Figure 2:
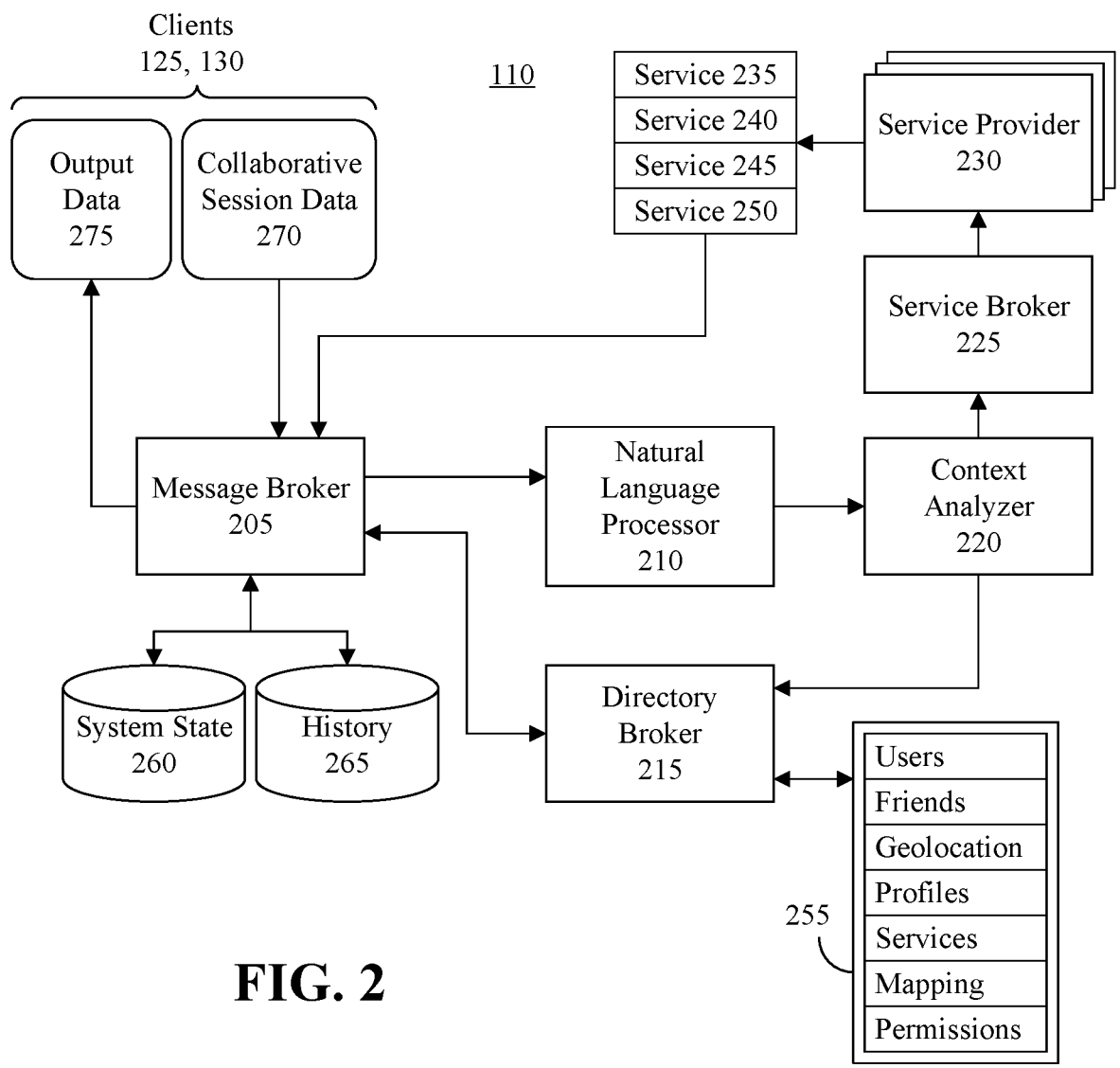
FIG. 2 is a block diagram illustrating an exemplary software architecture for the contextual dialog system of FIG. 1.

FIG. 2 is a block diagram illustrating an exemplary software architecture for system 110 of FIG. 1. As pictured, system 110 may include a message broker 205, a natural language processor 210, a directory broker 215, a context analyzer 220, a service broker 225, and one or more service providers 230.

Message broker 205 is configured to receive collaborative session data (session data) 270 from clients engaged in a collaborative session, e.g., clients 125 and 130. Session data 270 may include messages, e.g., text, that may include requests, parameters to be used in service requests, or the like. Message broker 205 may also send output data 275 to clients for a particular collaborative session to one more clients participating in a collaborative session (hereafter referred to as "participating client(s)". Output data 275 may include any messages to be distributed from one participating client to the other participating clients, UIs to be distributed to participating clients, and/or service results to be provided to participating clients.

As pictured, message broker 205 may be coupled to a system state repository 260 and a history repository 265. Each of the data repositories may be implemented as a data storage device or implemented within a same data storage device. Message broker 205 may be configured to store the current system state within system state repository 260 from time to time, periodically, or response to particular events such as responsive to sending and/or receiving data. In one aspect, message broker 205 may store system state information in an ongoing manner, e.g., without overwriting prior system information. Accordingly, a running history of system state information may be stored within system state repository 260. Message broker 205 may store system states on a per-collaborative session.

Message broker 205 further may store the history of all messages, requests, service requests, arguments, and service execution results on a per threaded conversation basis in history repository 265. Further, message broker 205 may store the list of users that are participating within the collaborative session, the time that users join and/or leave the collaborative session, the particular services that are added and/or removed to the collaborative session along with the times, and the like within history repository 265.

In one arrangement, message broker 205 may translate received messages into a format that may be processed by natural language processor 210. Messages received as part of collaborative session data may include natural language text. For example, message broker 205 may extract the text from the messages thereby removing the communications formatting and/or protocols.

Natural language processor 210 may be configured to perform Natural Language Processing (NLP) on the text output from message broker 205. Natural language processor 210 may be configured to understand free form textual input and build context. The free form textual input may be text entered by a user of a participant client or may be text derived from speech received through a participant client, e.g., speech recognized text.

NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency.

Directory broker 215 may be configured to access directory 255 to determine how messages, service requests, and service results are to be routed, whether within system 110 or when output to a participating client. For example, directory broker 215 may determine the particular users, e.g., contacts, and service providers to which the various content items noted above, e.g., messages, service requests, and/or service results, are to be sent.

Context analyzer 220 may be configured to distinguish between conversational text and text that may include one or more requests. In cases where context analyzer 220 determines that text from a participant client includes a request, or that portions of text may be interpreted as a request, context analyzer 220 may build a formal service request, e.g., an instruction or set of a plurality of instructions, and provide that service request to the service broker. The request may include a pneumonic and one or more arguments. The arguments may be explicitly provided from one or more participant clients or derived from processed text from one or more participant clients.

For example, context analyzer 220 may connect to directory broker 215 to fetch services, friends, geolocation, mapping, permissions, profiles permissions, and the like. Context analyzer 220 may build a context from the text and using the information obtained from directory broker 215, construct a service request using the context, and send the service request to service broker 225.

Service broker 225 may be configured to determine the particular service provider 230 to which the service request generated by context analyzer 220 is to be routed. System 110 may include one or more service providers 230. Each service provider may provide, or otherwise make available, one or more services such as service 235, 240, 245, and/or 250. Each service may be an application that may be made available for use and/or access by participant clients during a collaborative session. Each of service providers 230 may be configured to access a list of services available for that service provider 230 and route the service request to the appropriate service.

Results from one or more of services 235, 240, 245, and/or 250 may be provided to message broker 205. Message broker 205 may determine the appropriate participant clients to which the results are to be provided. For example, message broker 205 may access directory broker 215 to determine the participant client that issued the service request and/or the other participant clients for the collaborative session. In one aspect, message broker 205 may send or distribute output data 275 such as messages among participant clients as may be the case in a conventional instant messaging system. The messages that are exchanged among participant clients, as facilitated by system 110, may be processed through natural language processor 210 and/or context analyzer 220 in order to determine whether a service is to be invoked due to the identification of a request within the received text. In cases where a service request is identified, context analyzer 220 may generate a formal service request as described. In cases where a command is not identified, context analyzer 220 may not output any service request.

Figure 3:
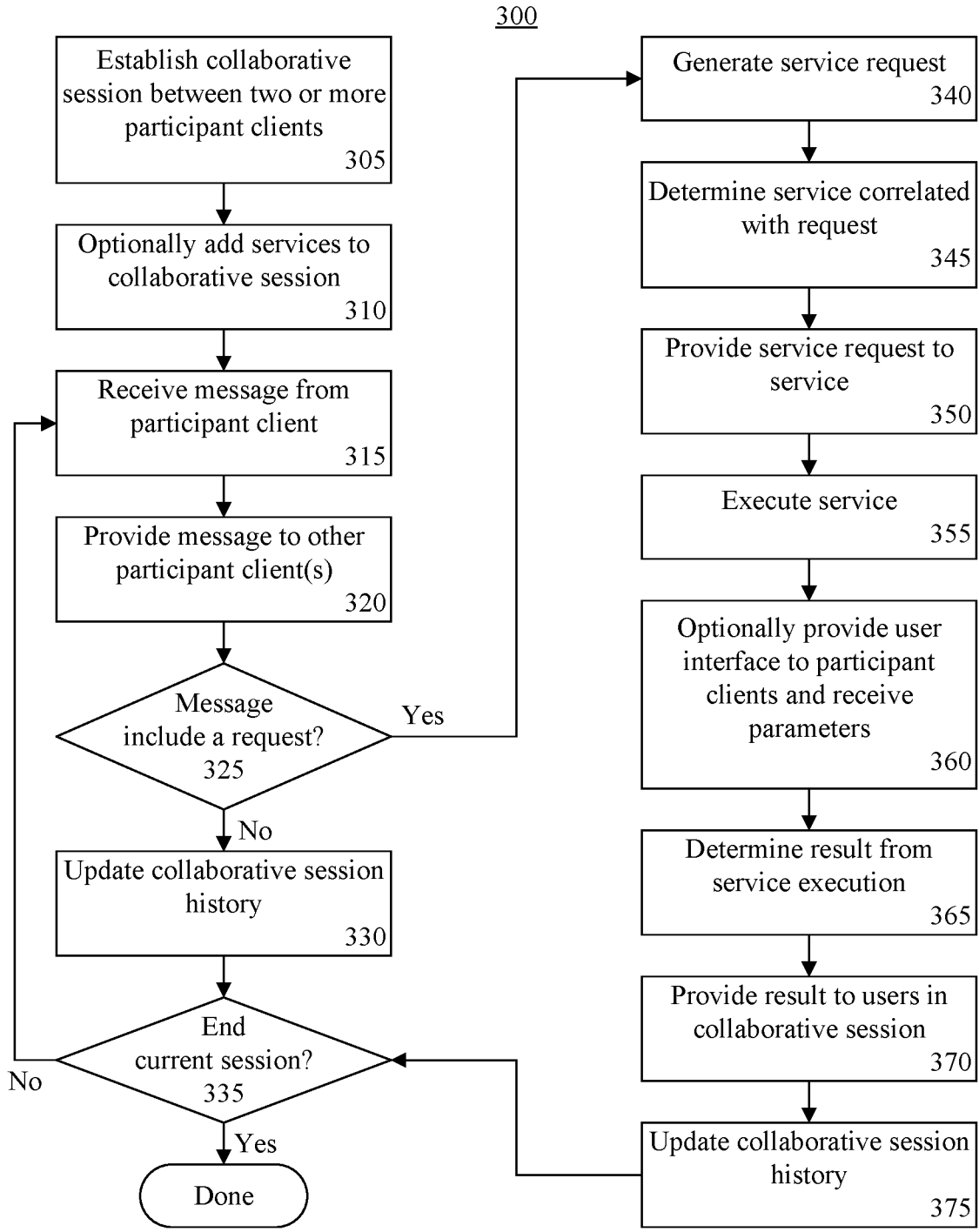
FIG. 3 is a flow chart illustrating an exemplary method of implementing a contextual dialog.

FIG. 3 is a flow chart illustrating an exemplary method 300 of implementing a contextual dialog. Method 300 may be implemented by a system such as system 110 as described with reference to FIGS. 1 and 2.

In block 305, the system may establish a messing session between two or more participant clients. In block 310, the system may optionally add one or more services to the collaborative session. In one aspect, the system may add services to the collaborative session responsive to requests from one or more of users of the participant clients. Further, the system may add services to the collaborative session dynamically responsive to the request(s).

In block 315, the system may receive a message from a participant client. In block 320, the system may provide and/or distribute the message to the other participant clients in the collaborative session. For example, the system may distribute the message to the participant clients as an instant message may be distributed. In block 325, the system may determine whether the message includes a request. If so, method 300 may continue to block 340. If not method 300 may continue to block 330.

For example, as described, the natural language processor may perform NLP on text of the message as received from the message broker. Further, the context analyzer may determine whether a request is identified from the processed output from natural language processor. The natural language processor and/or the context analyzer may detect the request, if one exists, within the message.

In block 330, the system may update the collaborative session history for the current collaborative session. The system may add the received message along with particular metadata such as the sender of the message, the time and/or date of the message, and the like to the collaborative session history within history repository 265. In block 335, the system may determine whether the current collaborative session has ended. If so, method 300 may end. If not, method 300 may loop back to block 315 to continue processing.

Continuing with block 340, the system may generate a service request from the received message. For example, the context analyzer may generate a service request from the output received from the natural language processor. In block 345, the system may identify a particular service that is correlated with the service request. In one arrangement, the context analyzer may provide the service request to the service broker. The service broker may select a service provider and provide the service request to the selected service provider. Service provider may select the particular service to which the service request is to be provided. In block 350, the system may provide the service request to the service identified in block 345. The service provider may send or route the service request to the appropriate service for execution. In block 355, responsive to providing the service request to the service, the service may be executed.

In block 360, the system may optionally provide a UI to participant clients of the collaborative session. In addition, the system may optionally receive parameters from one or more of the participant clients. For example, in executing the service, the service may generate a UI that may be provided by the system to the participant clients. In some cases, based upon the context determined from the messages of the collaborative session, one or more parameters may be identified and pre-populated within the UI provided to the participant clients. Users, working through their respective participant clients, may also enter data into the UI. The UI may include one or more interface elements that a user may select in order to send enter data back to the system. Accordingly any data entered by a user participating in the collaborative session may be sent back to the system and added to the service request and/or used to create a new service request for execution by the service.

In block 365, the service may determine or generate a result from execution responsive to the service request. In block 370, the system may send the result to the participant clients. In block 375, the system may update the collaborative session history. For example, the system may add any communications exchange between the system and the participant clients including UI, prepopulated results for the UI, data entered into UI by users, results from service execution, and the like. As noted, the messaging history may be threaded to preserve context of the overall dialogue conducted among the users participating in the collaborative session.

The inventive arrangements described herein, as further demonstrated in the examples to follow, illustrate how users participating in a collaborative session may access varied application functionality through services without leaving the collaborative session itself. Users may continue a messaging session uninterrupted while accessing the functionality of one or more different services from within the messaging session. Further, the results may be shared among the participants without having to initiate more complex screen sharing which may not be available using mobile devices and/or without sharing links that cause users to leave the collaborative session to perform other operations or access different functions.

FIGS. 4-17 are exemplary UIs that may be displayed by participating clients in accordance with the inventive arrangements described herein. FIGS. 4-17 illustrate the display screens of client devices engaged in a collaborative session as the collaborative session is initiated and continued.

Figure 4:
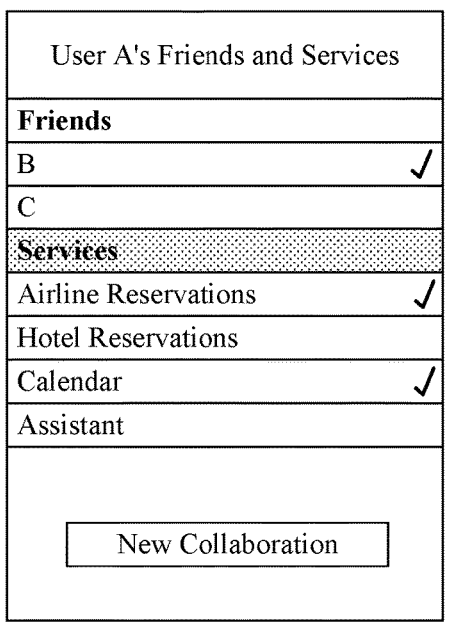
FIGS. 4-17 are exemplary user interfaces that may be displayed by participant clients.

FIG. 4 illustrates an exemplary UI that may be displayed by client 125. In the example of FIG. 4, user A has invoked a contextual messaging application and is presented with a list of available contacts, or friends, that may be included in a collaborative session and a list of available services that may be added to the collaborative session. User A may choose to establish a collaborative session with user B (e.g., of client 130). Further, user A may determine that, at least for purposes of this collaborative session, the airline reservation service and the calendar service would be useful. Accordingly, user A selects user B, the airline reservation service, and the calendar service for inclusion in a collaborative session to be established through system 110. User A may then select the "New Collaboration" control shown in FIG. 4.

Figure 5:
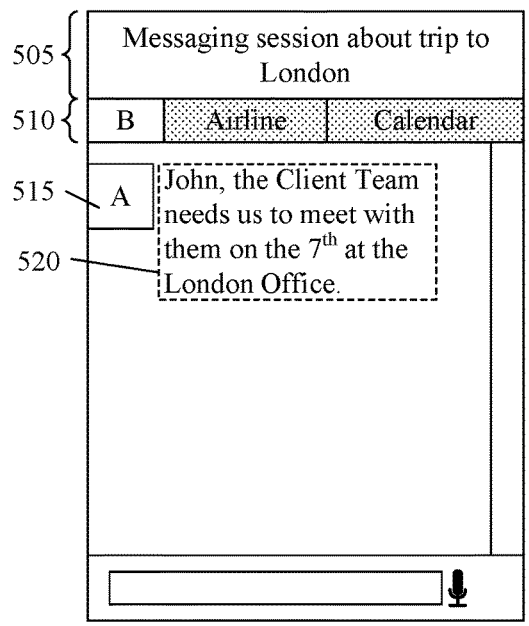

FIG. 5 illustrates another exemplary UI that may be displayed by client 125. In the example of FIG. 5, a collaborative session between user A of client 125 and user B of client 130 is established through system 110. Region 505 may indicate the subject matter or title for the collaborative session. In this respect, unlike other messaging systems, the context and subject matter of a collaborative session may be defined by the users as opposed to being defined, by default, according to the users involved in the collaborative session. For example, the current collaborative session may be one of a plurality of collaborative sessions between user A and user B and may be maintained separately in terms of threading and persistence, i.e., persisted as a separate and independent collaborative history from other prior collaborative sessions (and histories) between user A and user B. Still, user A may choose to continue a prior collaborative session, which may recall the collaborative history and continue the collaborative session.

Section 510 may list the users and services that are participating in the current collaborative session. In this case, region 510 indicates that user "B" is participating as is the airline reservations service (Airline) and the calendar service (Calendar). For purposes of illustration, services may be generally indicated by shading, whether of various controls, indicators, and/or identifiers, while users may be indicated using non-shaded objects. In one aspect, region 510 may be displayed only in the client of the originating user, i.e., user A. In other arrangements, however, region 510 may also be displayed in one or more other participant clients. User A has typed or dictated a message 520 that will be delivered to device 130 of user B. User A's communication may be indicated by an identifier 515 (non-shaded). An identifier representing a user or service such as identifier 515 may be the text name of user A, an initial or other text and/or symbols, an avatar selected by user A, an image of user A, or the like.

Figure 6:
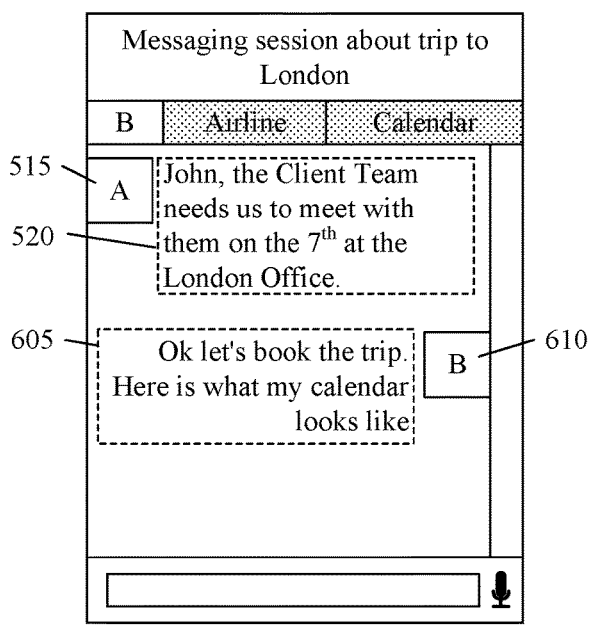

FIG. 6 illustrates another exemplary UI that may be displayed by client 125. FIG. 6 illustrates the state of the display screen of client 125 after user B has responded to message 520 with message 605. User B is indicated by identifier 610.

Figure 7:
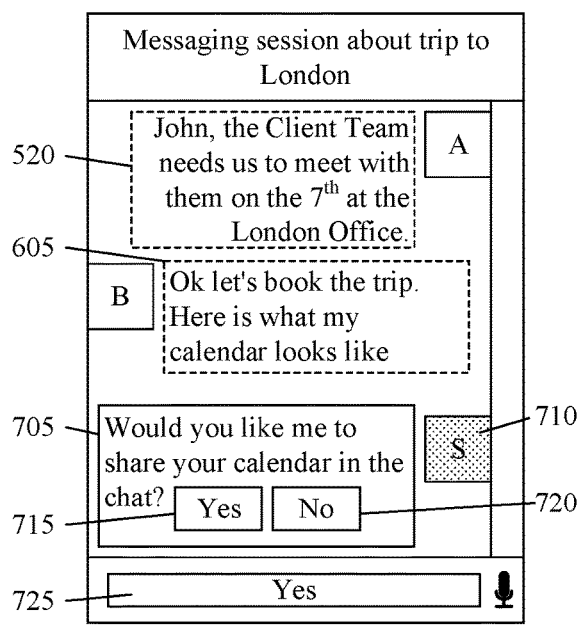

FIG. 7 illustrates an exemplary UI that may be displayed by client 130. FIG. 7 illustrates the state of the display screen of client 130 after user B has responded to message 520 with message 605. In the example of FIG. 7, the system has processed message 605 from user B and determined that message 605 may be interpreted as a request for services. In this example, the system responds to query user B as to whether user B intended to execute a service. As pictured, the system has generated a UI 705 and sent UI 705 to client 130.

In one aspect, the system may determine that message 605 from user B indicated an intent to share user B's calendar. User interface 705 is denoted as originating from the system by identifier 710. As pictured, user interface 705 is displayed by client 130 inline within the collaborative session ordered, in time, among the messages. Further user interface 705 may include user interface elements 715 and 720 that may be selected by user B. In this example, user B has specified "Yes" by either selecting (e.g., touching) user interface element 715, by typing "Yes" into field 725, or by speaking "Yes" into field 725.

In one arrangement, the system may send UI 705 only to the particular user from which the request was detected. In that case, UI 705 may be sent only to client 130 for user B. If user B chooses to invoke the service, the service may then be available to both user A and to user B. In another arrangement, the system may send UI 705 to both user A and to user B, e.g., to both clients 125 and 130. Each respective user may choose invoke the calendar service to share their calendar with the other user.

For purposes of illustration and with reference to FIG. 2, the system may implement the above-described process to confirm whether user B intends to invoke a service. For example, the system may process messages 520 and/or 605. Message broker 205 may receive the messages. Natural language processor 210 may perform natural language processing on the messages. Context analyzer 220 may determine a context using directory broker 215. In one aspect, context analyzer 220 may provide the context, e.g., specifying the clarification required as UI 705 or a message to that effect, to directory broker 215. Directory broker 215 may output the context to message broker 205, which may in turn send the context to the appropriate client(s). As such, the system may perform the initial confirmation.

Figure 8:
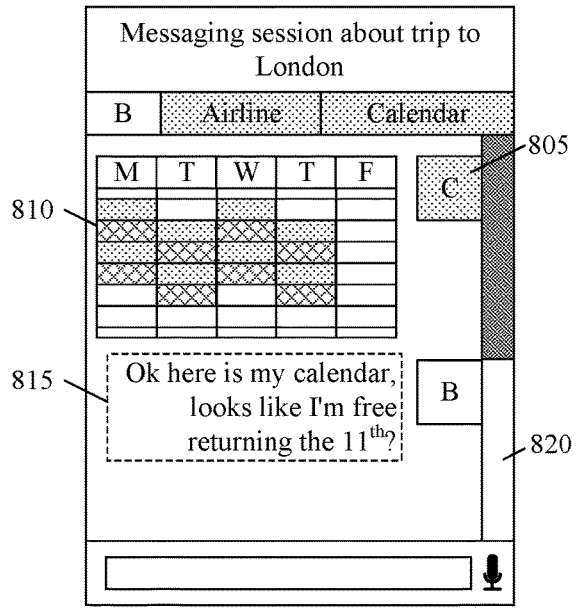

FIG. 8 illustrates another exemplary UI that may be displayed by client 125. FIG. 8 illustrates the state of the display screen of client 125 after user B has responded "Yes" to sharing the calendar with user A. In the example of FIG. 8, the system detects the "Yes" response and invokes, or executes, the calendar service as indicated by identifier 805. The service has generated a result 810 shown as an image of a portion of user B's calendar. The system has provided result 810 to client 125 to share the calendar of user B with user A. Further, user B has responded with message 815. Within FIG. 8, a scroll bar 820 is now shown since the history of the collaborative session has grown too large to fit on the screen. Scroll bar 820 illustrates that user A may scroll back up through the collaborative session to view the prior interactions.

For purposes of illustration and with reference to FIG. 2, client 130 has provided a response to the system as "Yes." In one aspect, user selection of "Yes" may cause client 130 to send a response, e.g., an instant message with the text "Yes", to the system initiating execution of the service. For example, message broker 205 may receive the response from client 130, natural language processor 210 may perform natural language processing on the response, and context analyzer 220 may determine a context and generate a request that is provided to service broker 225, etc., as described.

In another aspect, UI 705 may include additional program code that may be executed by client 130 responsive to a user selection of the "Yes" or "No" UI elements. For example, responsive to user B selecting "Yes", client 130 may be programmed to send a particular service request that may be received by the system. For example, UI 705, as generated by the system, may include a formed service request that may be sent by client 130 responsive to user selection of the "Yes" UI element.

Figure 9:
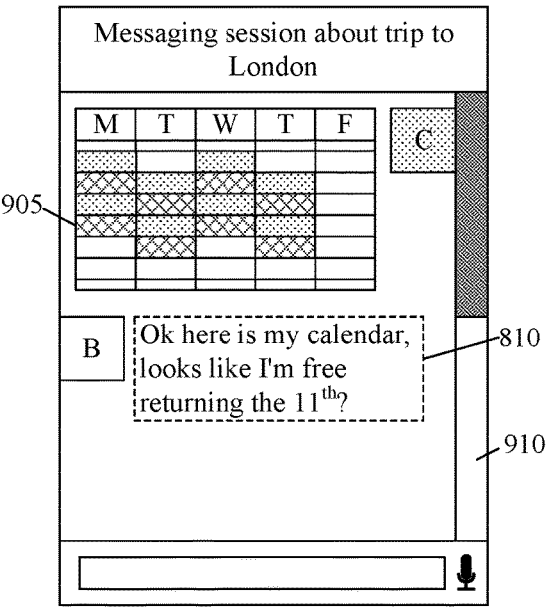

FIG. 9 illustrates another exemplary UI that may be displayed by client 130. FIG. 9 illustrates the state of the display screen of client 130 after user B has responded "Yes". FIG. 9 illustrates that the system also may send the result the calendar service to client 130. Further, user B's message 810 is also displayed. As such, client devices 125 and 130 may receive same or similar content. Scroll bar 910 is also shown illustrating that user B may scroll back through the collaborative session history.

Figure 10:
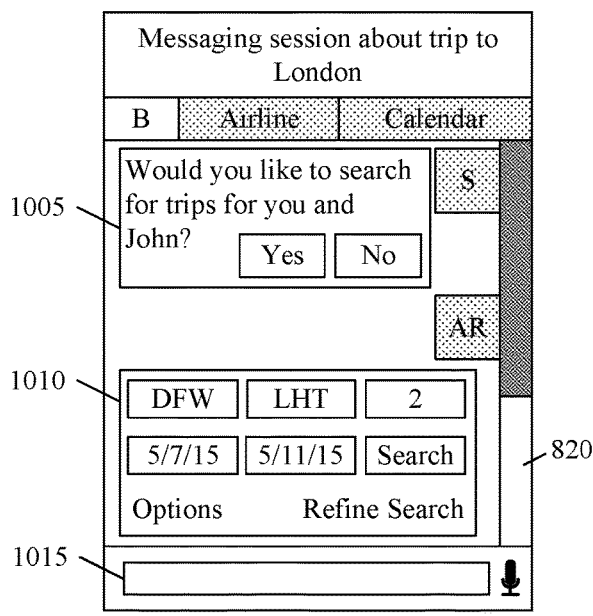

FIG. 10 illustrates another exemplary UI that may be displayed by client 125. In the example of FIG. 10, the system has identified a potential request for flights from message 810. Accordingly, the system generates UI 1005 and sends UI 1005 to client 125 to query user A whether user A would like to search for flights. In the example of FIG. 10, the system may send a query, e.g., UI 1005, to client 125 confirming intent to execute a service and only execute the service responsive to receiving a response from the client 125 indicating intent to execute the service.

In one aspect, part of the context of the collaborative session includes the particular services included in the collaborative session. In this regard, the system may determine potential requests for services based upon the services associated with the collaborative session. In this example, the inference of taking a trip may be associated with the airline service added to the collaborative session rather than inferring a request for a different service that has not been added to the current collaborative session. In this example, user A has provided an input specifying "Yes".

Accordingly, the system may invoke the airline reservation service. Airline reservation service, indicated by the shaded "AR" identifier, may generate user interface 1010 as a result. The system provides UI 1010 to client 125. In one aspect, the system may determine that user B has indicated time available for a trip and a potential return date of the 11$^{th}$ for the current month. In this example, based upon calendar information for user B, context of the messages exchanged between user A and user B, etc., the parameters for one or more fields of UI 1010 may be pre-filled by the system and/or service. For example, the originating airport "DFW", the destination airport "LHT", number of passengers "2", depart date of "May 7, 2015" and a return date of "May 11, 2015" may be estimated based upon user profiles for user A and user B specifying home and/or work locations, the context of the messages, and the like. It should be appreciated, however, that the various fields of UI 1010 may be active so that user A may simply overwrite any data that the system may have pre-filled. When the parameters are correctly entered into UI 1005, user B may select "Search", enter "Search" in field 1015, or say "Search".

Figure 11:
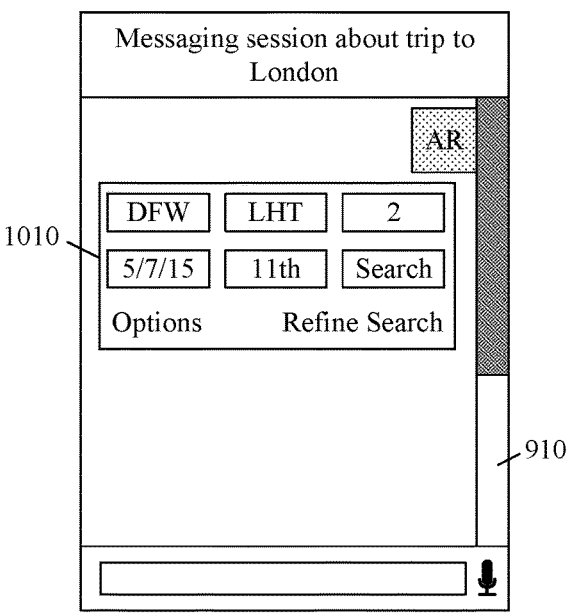

FIG. 11 illustrates another exemplary UI that may be displayed by client 130. In the example of FIG. 11, UI 1010 is also displayed. The various fields of user interface 1010 may be pre-filled as described. Further, user B may enter new and/or different values into the fields of UI 1010 and/or activate the search. In the example shown, the system did not provide UI 1010 to client 130 since user A is the originator of the collaborative session. In another aspect, the system may send the confirmatory UI, i.e., UI 1005, to the particular user that sent the message in which the potential request was detected. Once UI 1010 is provided to client 130, user B may interact with, and use, the airline reservation service.

The ability to incorporate a service into a collaborative session may make that service available to one or more or all users in the collaborative session. Referring to the prior example, user A may be a subscriber to the airline reservation service. User B may not be a subscriber. Still, by adding the airline reservation service to the collaborative session, user A may expose the service to user B so that user B may also enter data, search, view results, and the like from the service. As illustrated, the system may confirm whether to execute a service by first obtaining confirmation from the originator of the collaborative session.

Figure 12:
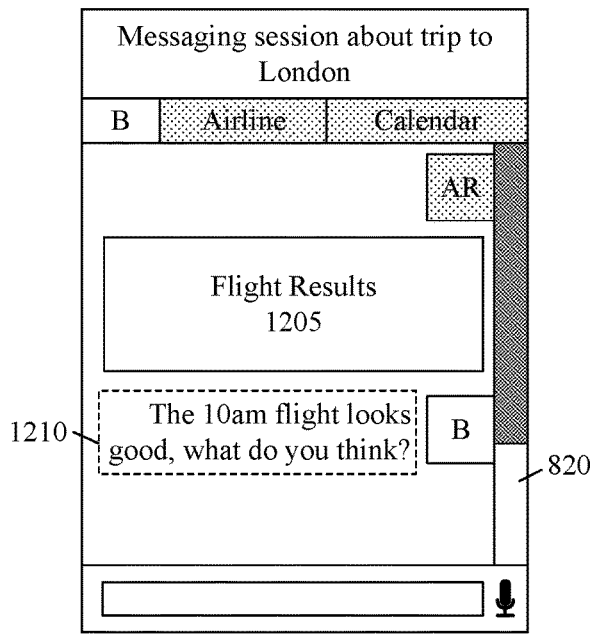

FIG. 12 illustrates another exemplary UI that may be displayed by client 125. FIG. 12 illustrates the state of the display screen of client 125 subsequent to either user A or user B selecting the "Search" option within UI 1010. In the example of FIG. 12, the airline service performs a search using the parameters provided from user interface 1010. For example, the client may send the parameters to the system as a message. The parameters may be extracted and provided to the airline reservation service to complete a service request or as part of a new service request. The airline reservation service generates flight results 1205, which the system provides to client 125. Flight results 1205 may be displayed as a graphic, as text, or the like. In one example, flight results 1205 may include one or more controls that may be selected to book one or more of the flight options. Further, user B has responded with message 1210 indicating that a particular flight of flight results 1205, e.g., the 10:00 am flight, may be desired.

Figure 13:
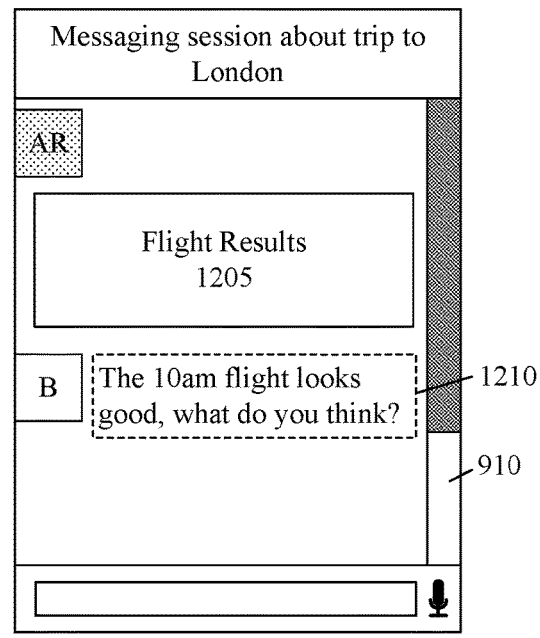

FIG. 13 illustrates another exemplary UI that may be displayed by client 130. FIG. 13 illustrates that the same flight results 1205 may be shown to user B via client 130. Further, message 1210 originating from user B is shown.

Figure 14:
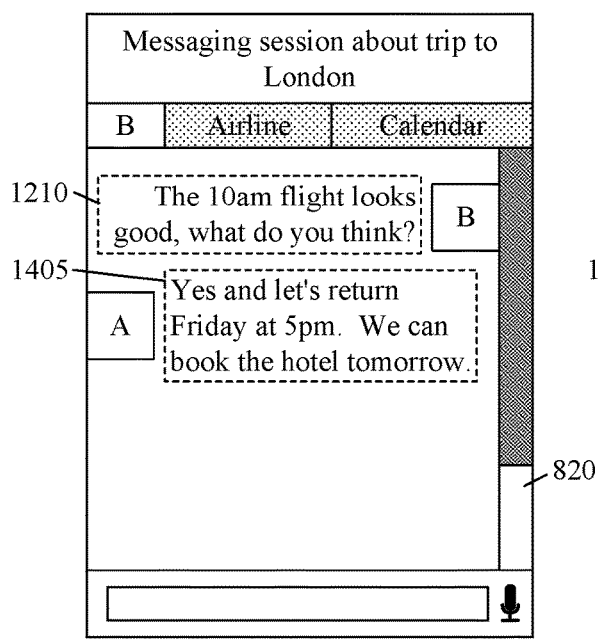

FIG. 14 illustrates another exemplary UI that may be displayed by client 125. FIG. 14 illustrates the state of the display screen of client 125. FIG. 14 illustrates that the conversation between user A and user B has continued with user A responding to user B with message 1405 that indicates a preference for a particular return flight.

Figure 15:
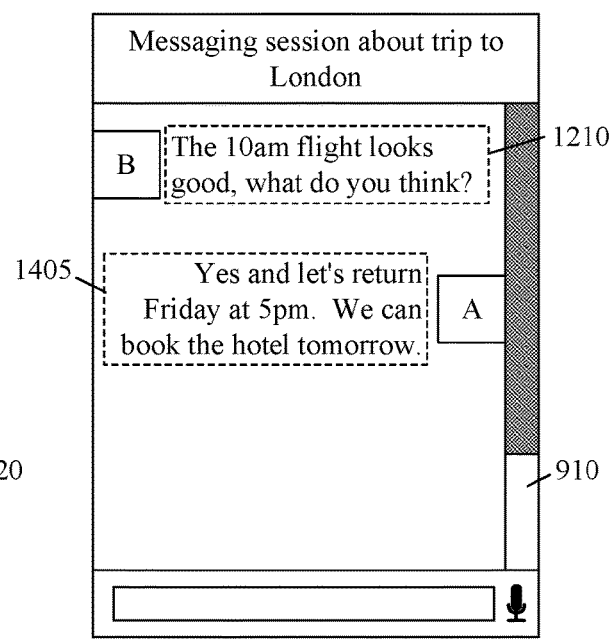

FIG. 15 illustrates another exemplary UI that may be displayed by client 130. FIG. 15 illustrates that client 130 may receive message 1405 from user A indicating a preference for a particular return flight.

Figure 16:
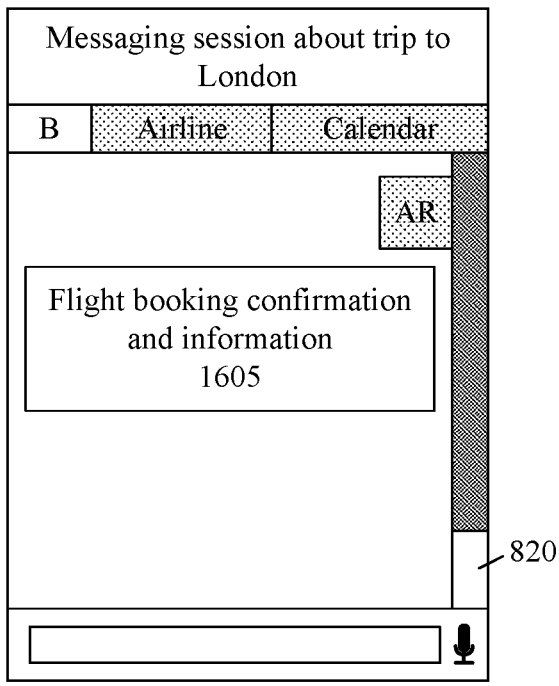

FIG. 16 illustrates another exemplary UI that may be displayed by client 125. FIG. 16 illustrates that the system has processed messages 1205 and 1405 with reference to the available flights of flight results 1205 and submitted the resulting parameters, i.e., flight selections, to the airline reservation service. The airline reservation service, in response, has booked the flights specified in each respective one of messages 1205 and 1405 for user A and for user B and generated flight booking confirmation and information 1605 as a result, which the system has sent to client 125.

Figure 17:
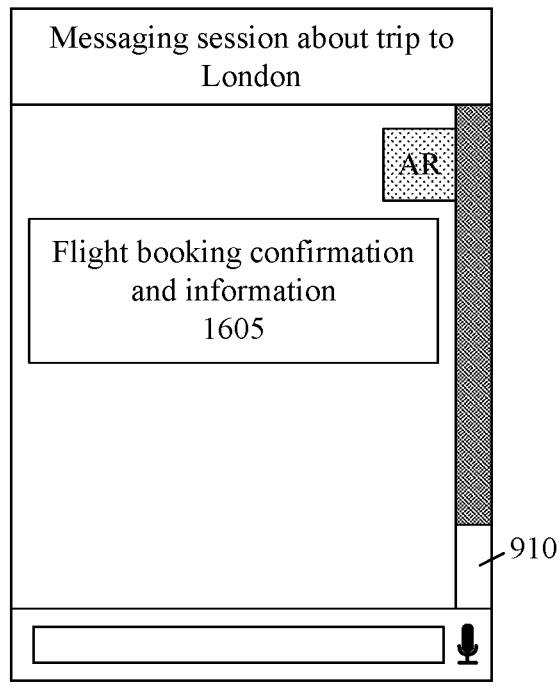

FIG. 17 illustrates another exemplary UI that may be displayed by client 130. FIG. 17 illustrates that the system has provided flight booking and confirmation information 1605 to client 130 also. The results of execution of the airline reservation service are accessed and shared by both user A and user B.

Figure 18:
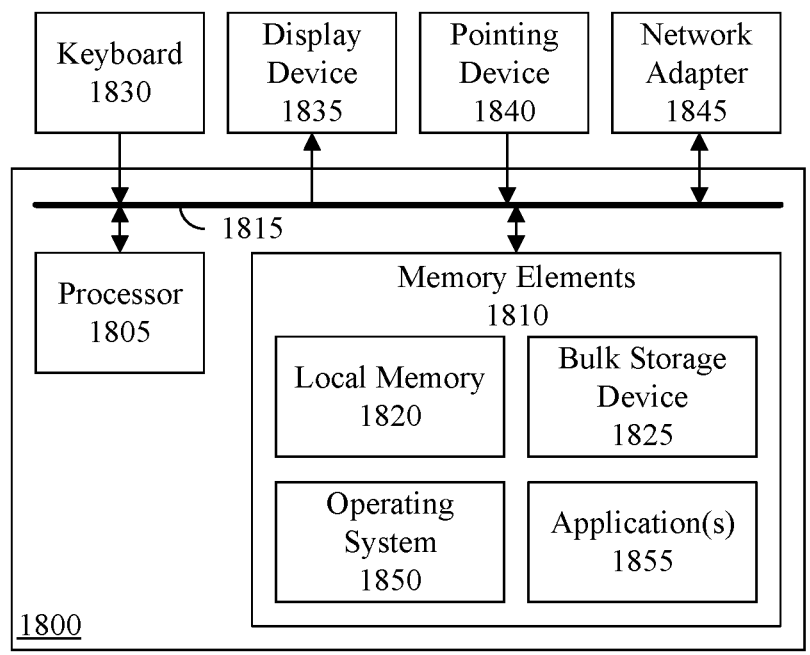
FIG. 18 is a block diagram illustrating an exemplary architecture for a data processing system.

FIG. 18 is a block diagram illustrating an exemplary architecture 1800 for a data processing system. Architecture 1800 may be used to implement a computer that is suitable for storing and/or executing program code. In one aspect, architecture 1800 may be used to implement system 110 of FIGS. 1 and 2. In another aspect, architecture 1800 may be used to implement one or more of the clients that may interact with system 110 as described herein.

Architecture 1800 includes at least one processor 1805, e.g., a central processing unit (CPU), coupled to memory elements 1810 through a system bus 1815 or other suitable circuitry. Architecture 1800 stores program code within memory elements 1810. Processor 1805 executes the program code accessed from memory elements 1810 via system bus 1815. In one aspect, architecture 1800 may be used to implement a computer or other data processing system that is suitable for storing and/or executing program code. It should be appreciated, however, that architecture 1800 may be used to implement any system including a processor and memory that is capable of performing the functions described within this disclosure. For example, architecture 1800 may be used to implement a mobile device such as a phone, radio, or the like.

Memory elements 1810 include one or more physical memory devices such as, for example, a local memory 1820 and one or more bulk storage devices 1825. Local memory 1820 may be implemented as a random access memory (RAM) or other non-persistent memory device(s) generally used during actual execution of the program code. Bulk storage device 1825 may be implemented as a hard disk drive (HDD), solid state drive (SSD), or other persistent data storage device. Architecture 1800 also may include one or more cache memories (not shown) that provide temporary storage of at least some program code in order to reduce the number of times program code must be retrieved from the bulk storage device during execution.

Input/output (I/O) devices such as a keyboard 1830, a display device 1835, and a pointing device 1840 optionally may be coupled to architecture 1800. In one aspect, display device 1835 may be a touch sensitive display device that is configured to receive touch inputs. In that case, keyboard 1830 may be omitted or implemented using display device 1835. The I/O devices may be coupled to architecture 1800 either directly or through intervening I/O controllers.

A network adapter 1845 may also be coupled to architecture 1800 to enable a system implemented using architecture 1800 to become coupled to other systems, computer systems, remote printers, and/or remote storage devices through intervening private or public networks. Modems, cable modems, Ethernet cards, and wireless transceivers are examples of different types of network adapter 1845 that may be used with architecture 1800. It should be appreciated that the number and/or type of network adapters 1845 included in architecture 1800 may vary according to the particular device that is being implemented. In the case of a mobile device, network adapter 1845 may represent one or more short range wireless transceiver(s) and one or more long range (e.g., cellular) mobile transceivers.

Memory elements 1810 store an operating system 1850 and an application 1855. Operating system 1850 and application 1855, being implemented in the form of executable program code, are executed by architecture 1800. As such, operating system 1850 and/or application 1855 may be considered an integrated part of any system implemented using architecture 1800. Application 1855 and any data items used, generated, and/or operated upon by architecture 1800 while executing application 1855 are functional data structures that impart functionality when employed as part of architecture 1800.

In the case where architecture 1800 is used to implement system 110 of FIG. 1, operating system 1850 may be a server-side operating system; and, application 1855 may be a server-side application that, when executed, causes the server to perform the various operations described herein and attributable to system 110. For example, application 155 may be representative of the software architecture of FIG. 2.

In the case where architecture 1800 is used to implement a client of FIG. 1, operating system 1850 may be a client-side operating system; and, application 1855 may be a client-side application that, when executed, causes the client to perform the various operations described herein attributable to the client(s).

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   establishing a collaborative session not using screen sharing between a first client device and a second client device;
   receiving a message from the first client device;
   detecting a request for a service within the message;

only executing the service responsive to receiving from the first client device an indication to execute the service;

invoking, responsive to the request, a service correlated with the request; and providing, in response to the message and to the first and second client devices, a result from execution of the service as part of the collaborative session.

2. The method of claim 1, wherein
the message is provided to the second client device.

3. The method of claim 1, wherein
the service is added to the collaborative session at runtime.

4. The method of claim 1, wherein
the request is detected by:
   performing natural language processing on the message to identify the request; and
   selecting the service, according to the request, from a plurality of services available for the collaborative session.

5. The method of claim 1, wherein
the result is provided by sending a user interface generated by the service to the first client and the second client, and
at least one parameter is used by the service to determine the result is received from the first client device or the second client device via the user interface.

6. A computer hardware system, comprising:
a hardware processor configured to initiate the following executable operations:
establishing a collaborative session not using screen sharing between a first client device and a second client device;
receiving a message from the first client device;
detecting a request for a service within the message;
only executing the service responsive to receiving from the first client device an indication to execute the service;
invoking, responsive to the request, a service correlated with the request; and
providing, in response to the message and to the first and second client devices, a result from execution of the service as part of the collaborative session.

7. The system of claim 6, wherein
the message is provided to the second client device.

8. The system of claim 6, wherein
the service is added to the collaborative session at runtime.

9. The system of claim 6, wherein
the request is detected by:
   performing natural language processing on the message to identify the request; and
   selecting the service, according to the request, from a plurality of services available for the collaborative session.

10. The system of claim 6, wherein
the result is provided by sending a user interface generated by the service to the first client and the second client, and
at least one parameter is used by the service to determine the result is received from the first client device or the second client device via the user interface.

11. A computer program product, comprising:
a computer readable storage medium having program code stored therein, the program code, which when executed by a computer hardware system, causes the computer hardware system to perform:
establishing a collaborative session not using screen sharing between a first client device and a second client device;
receiving a message from the first client device;
detecting a request for a service within the message;
only executing the service responsive to receiving from the first client device an indication to execute the service;
invoking, responsive to the request, a service correlated with the request; and
providing, in response to the message and to the first and second client devices, a result from execution of the service as part of the collaborative session.

12. The computer program product of claim 11, wherein
the message is provided to the second client device.

13. The computer program product of claim 11, wherein
the service is added to the collaborative session at runtime.

14. The computer program product of claim 11, wherein
the request is detected by:
   performing natural language processing on the message to identify the request; and
   selecting the service, according to the request, from a plurality of services available for the collaborative session.

15. The computer program product of claim 11, wherein
the result is provided by sending a user interface generated by the service to the first client and the second client, and
at least one parameter is used by the service to determine the result is received from the first client device or the second client device via the user interface.

* * * * *